United States Patent
Gifford et al.

(10) Patent No.: US 9,287,592 B2
(45) Date of Patent: Mar. 15, 2016

(54) PROCESS FOR FORMING A BATTERY CONTAINING AN IRON ELECTRODE

(71) Applicant: Encell Technology, Inc., Alachua, FL (US)

(72) Inventors: Paul Gifford, Cape Coral, FL (US); Randy Ogg, Newberry, FL (US); Phil Bennett, Waldo, FL (US)

(73) Assignee: ENCELL TECHNOLOGY, INC., Alachua, FL (US)

( * ) Notice: Subject to any disclaimer, the term of this patent is extended or adjusted under 35 U.S.C. 154(b) by 155 days.

(21) Appl. No.: 14/173,962

(22) Filed: Feb. 6, 2014

(65) Prior Publication Data

US 2014/0217985 A1    Aug. 7, 2014

Related U.S. Application Data

(60) Provisional application No. 61/761,312, filed on Feb. 6, 2013, provisional application No. 61/901,698, filed on Nov. 8, 2013.

(51) Int. Cl.
*H01M 4/38* (2006.01)
*H01M 10/44* (2006.01)
*H01M 4/62* (2006.01)
*H01M 4/24* (2006.01)
*H01M 10/30* (2006.01)

(52) U.S. Cl.
CPC ............ *H01M 10/44* (2013.01); *H01M 4/248* (2013.01); *H01M 4/622* (2013.01); *H01M 10/30* (2013.01); *H01M 2300/0014* (2013.01); *H01M 2300/0091* (2013.01); *Y02E 60/124* (2013.01)

(58) Field of Classification Search
CPC ............... H01M 10/30; H01M 2300/0014; H01M 4/621; H01M 4/622; H01M 10/44; H01M 4/38
USPC .......................................... 320/130
See application file for complete search history.

(56) References Cited

U.S. PATENT DOCUMENTS

| | | | |
|---|---|---|---|
| 2,871,281 | A | 1/1959 | Moulton et al. |
| 3,898,098 | A | 8/1975 | Giles |
| 4,250,236 | A | 2/1981 | Haschka et al. |
| 6,392,385 | B1 | 5/2002 | Barker et al. |
| 6,558,848 | B1 | 5/2003 | Kobayashi et al. |
| 6,844,111 | B2 | 1/2005 | Mirzoev et al. |
| 2007/0231698 | A1 | 10/2007 | Kawase et al. |
| 2010/0323231 | A1 | 12/2010 | Sakai et al. |
| 2011/0123850 | A1 | 5/2011 | Duong et al. |
| 2012/0187918 | A1 | 7/2012 | Narayan et al. |
| 2014/0220430 | A1* | 8/2014 | Ogg ............ H01M 4/248 429/206 |
| 2014/0220432 | A1* | 8/2014 | Ogg ............ H01M 10/26 429/207 |
| 2014/0322598 | A1* | 10/2014 | Ogg ............ H01M 4/248 429/206 |

OTHER PUBLICATIONS

International Search Report from Corresponding Application No. PCT/US2014/015055 mailed May 22, 2014.
International Search Report from corresponding Application No. PCT/US2014/015049 mailed May 27, 2014.

\* cited by examiner

*Primary Examiner* — Sun Lin
(74) *Attorney, Agent, or Firm* — Merchant & Gould, P.C.

(57) ABSTRACT

Provided is a process for activating a battery comprising an iron electrode. The process comprises providing a battery comprising a cathode and an iron anode. The battery further comprises an electrolyte comprising NaOH, LiOH and a sulfide. The battery is then cycled to equalize the state-of-charge of the cathode and iron anode.

20 Claims, No Drawings

PROCESS FOR FORMING A BATTERY CONTAINING AN IRON ELECTRODE

CROSS REFERENCE TO RELATED APPLICATIONS

This application claims priority to U.S. Provisional Application Ser. No. 61/761,312, filed Feb. 6, 2013; and U.S. Provisional Application Ser. No. 61/901,698, filed Nov. 8, 2013, which applications are incorporated herein by reference in their entirety.

BACKGROUND OF THE INVENTION

1. Field of the Invention

This invention is in the technical field of energy storage devices, particularly alkaline batteries. More particularly, the present invention is in the technical field of rechargeable batteries employing an iron negative electrode in an alkaline electrolyte, and the formation of such a battery.

2. State of the Art

Iron electrodes have been used in energy storage batteries and other devices for over one hundred years. Iron electrodes are often combined with a nickel positive electrode to form a nickel-iron (Ni—Fe) battery. The Ni—Fe battery is a rechargeable battery having a nickel(III) oxy-hydroxide positive electrode and an iron negative electrode, with an alkaline electrolyte such as potassium hydroxide. The overall cell reaction can be written as:

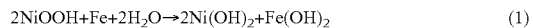

$$2\text{NiOOH} + \text{Fe} + 2\text{H}_2\text{O} \rightarrow 2\text{Ni(OH)}_2 + \text{Fe(OH)}_2 \qquad (1)$$

It is a very robust battery which is tolerant of abuse (overcharge, overdischarge, and short-circuiting) and can have a very long life even if so treated. Ni—Fe batteries are often used in backup situations where it can be continuously charged and may last for more than 20 years. However, due to its low specific energy, poor charge retention, and high cost of manufacturing, other types of rechargeable batteries have displaced Ni—Fe in most applications.

The ability of these batteries to survive frequent cycling is due to the low solubility of the reactants in the electrolyte. The formation of metallic iron during charge is slow due to the low solubility of the reaction product ferrous hydroxide. While the slow formation of iron crystals preserves the electrodes, it also limits the high rate performance. Ni—Fe cells are typically charged galvanostatically and should not be charged from a constant voltage supply since they can be damaged by thermal runaway. Thermal runaway occurs due to a drop in cell voltage as gassing begins due to overcharge, raising the cell temperature, increasing current draw from a constant potential source, further increasing the gassing rate and temperature.

As shown in Equation (1), the overall cell reaction does not involve the battery electrolyte; however, alkaline conditions are required for the individual electrode reactions. Therefore, iron-based batteries such as Ni—Fe, Fe-air, and Fe—MnO$_2$ batteries all employ a strong alkaline electrolyte typically of KOH, typically in the range of 30-32% KOH. KOH is preferred due to its higher conductivity and low freezing point. LiOH may be added in cells subject to high temperatures due to its stabilization effects on the nickel electrode, improving its charge acceptance at elevated temperatures.

A known performance issue of iron electrodes is premature passivation of the iron surface. Thus, iron electrodes whose active mass consists of pure iron become passivated after a limited number of cycles. This is apparently due to the formation of iron oxides that form on the electrode surface, inhibiting the charging process.

It is known in the art that the addition of sulfur or sulfides can be added to the iron electrode active mass to inhibit the passivation of the electrode (D. Linden and T. Reddy, Editors, "Handbook of Batteries, Third Edition", McGraw-Hill, © 2002). Sulfur and/or sulfide addition changes the electrocrystallization kinetics and makes the iron electrode reaction more reversible. Sulfide also is known to absorb on the iron electrode, raising the overpotential for the hydrogen evolution reaction during charging. A disadvantage of the prior art associated with adding sulfur or sulfides to the iron active mass is loss of sulfide over time due to dissolution of sulfide into the electrolyte and resultant oxidation to sulfate, which is ineffective in providing lasting activation of the iron electrode.

The addition of sulfide additives to alkaline electrolyte is similarly known in the art. Particularly, the addition of sulfur content is described in Swedish Pat. No 196,168 which recommends sulfide concentrations on the order of 0.03 to 0.1% of the iron active mass. However, it has been suggested by others that if the local sulfide concentration is too high, the activating effect is actually reversed due to blockage of the active mass. Hence, U.S. Pat. No. 4,250,236A teaches the use of sparingly soluble sulfide compounds whose solubility is at most $10^{-2}$ moles per liter. These inventors state that high concentrations of sulfide do not result in any substantial prolongation of the electrode lifetime due to oxidation of sulfide to sulfate, which may precipitate and block the pores of the electrode.

One problem associated with current Ni—Fe batteries is the high rate of self-discharge associated with hydrogen evolution occurring at the charged iron electrode. This occurs due to the fact that the potential for hydrogen evolution is less negative than the potential for the electrode reaction during charge of Fe(OH)$_2$ to Fe. Kinetic effects allow for the charge reaction to proceed, but at low efficiencies.

Another problem associated with present art Ni—Fe batteries is the need for prolonged activation of the cell. As shown in Equation 1, the fully charged negative electrode consists of metallic iron. Hence, as constructed, the iron electrode is in a near fully charged state, existing predominately of metallic iron. In contrast, as constructed the Ni(OH)$_2$ electrodes exist in a fully discharged state in the assembled cell. Thus, the resultant as-constructed cell is largely out of balance with respect to state of charge. Hence, multiple cycles are required to achieve appropriate cell balance by bringing both electrodes to the same state of charge. During initial charge cycles, copious amounts of hydrogen gas are generated at the charged iron electrode during charging of the nickel positive plates.

The formation process is a time-consuming and expensive operation in the manufacture of rechargeable batteries due to the need for expensive battery cycling equipment. As formation time increases, additional capital equipment is required to meet the needs for cycling of multiple batteries, resulting in significant cost. A process reducing formation and activation time, and complexity, would result in significant savings to the battery manufacturer, and would be welcomed by the industry.

SUMMARY OF THE INVENTION

The present invention provides one with a formation process that significantly reduces the overall time required for formation and activation of a battery employing an iron electrode. By utilizing a ternary electrolyte comprised of NaOH, LiOH, and a sulfide additive in conjunction with an iron electrode of an adherent type on a single sided substrate, the time required to achieve proper cell balance is significantly reduced, and yielding a battery with improved performance.

The process comprises activating a battery comprising an iron electrode. The process comprises the steps of first providing a battery comprising a cathode and an iron anode, with the battery further comprising an electrolyte comprising NaOH, LiOH and a sulfide. The battery is then cycled to equalize the state-of-charge of the cathode and iron anode. In one embodiment, the cathode is a nickel cathode. In another embodiment, the sulfide is a metal sulfide, e.g., an alkali metal sulfide such as sodium sulfide.

Among other factors, it has been discovered that by preparing a battery comprising an iron electrode, and using a ternary sodium hydroxide electrolyte further comprising LiOH and a sulfide additive, the number of cycles required to activate or form the battery is reduced. Not only is formation expedited, but is has also been discovered that the resulting battery has improved performance in terms of capacity.

DETAILED DESCRIPTION OF THE INVENTION

The invention comprises a process for formation and activation of a battery with an iron electrode in contact with a particular electrolyte, said electrolyte being a sodium hydroxide based electrolyte with the NaOH generally having a concentration of 5-7.5 M in the electrolyte. Additionally, the electrolyte contains lithium hydroxide and a metal sulfide. The metal sulfide is generally present in an amount ranging from 1-2 wt %. The lithium hydroxide concentration is generally in the range of from 0.5 to 2.0 M, e.g., 1 M. In one embodiment, the NaOH concentration is about 6 M, the LiOH concentration is on the order of 1 M, and the sodium sulfide concentration in the electrolyte is about 1 wt %.

Formation or activation is the process in which a freshly assembled cell or battery is electrically charged and discharged to fully activate the electrodes. Most conventional batteries such as NiCd or NiMH have electrodes that are in a fully discharged state as assembled. However, a Ni—Fe battery poses a challenge in formation in that the negative electrode is comprised predominately of metallic iron, which represents the fully charged state of the electrode. By contrast, nickel electrodes of a pasted or sintered construction exist in a fully discharged state. When the iron electrode is combined with a conventional nickel positive electrode, the result is a cell which is out of balance with respect to state-of-charge. In order for the battery to function properly, it is necessary to equalize the electrodes' states-of-charge. This is done by electrically charging and discharging the cell or battery repeatedly until equalization occurs.

An additional problem is that since the iron electrode is initially fully, or near fully charged, during the early charging cycles of the battery, hydrogen gas is generated at the already charged negative electrode. This presents various problems in that the gas must be vented and water loss occurs.

The inventors have found unexpectedly that the use of a sodium-based electrolyte improves charge retention compared to the conventional KOH electrolyte. The entire cell is also more stable and effective at high temperatures due to the addition of LiOH, which improves charge acceptance of the positive electrode, particularly a $Ni(OH)_2$ positive electrode, thereby increasing cell capacity. The presence of sulfide in the electrolyte has been discovered to be important for the effective deposition of sulfur on the iron negative electrode. A cell or battery with an iron anode performs better with sulfide in the electrolyte, as the sulfide deposits on the iron anode as a performance enhancer after only a few cycles. The sulfide is believed to increase the effective surface area of the iron, so one obtains more utilization of the iron active mass, resulting in higher capacity and power. In addition, the added sulfide is believed to form iron sulfides, two of the form being FeS and $Fe_2S_3$, both of which are more electrically conductive than $Fe(OH)_2$ which normally forms on the iron surface. These conductive sites on the iron surface create a situation in which the oxidized layer that forms on the iron surface is thicker before true electrical passivation occurs allowing for more efficient use of the underlying iron active material. Various sulfide salts may be employed to obtain this desirable result. Generally, the salt is a metal salt, and in one embodiment an alkali metal salt. In one embodiment, the sulfide salt is sodium sulfide. It has been discovered that this improvement in active material utilization and electrode conductivity not only improves battery performance and life, it allows for more rapid formation and activation of as-assembled batteries.

The present process comprises the steps of first providing a battery comprising a cathode and an iron anode, with the battery further comprising an electrolyte comprising NaOH, LiOH and a sulfide. The battery is then cycled to equalize the state-of-charge of the cathode and iron anode. In one embodiment, the cathode is a nickel cathode. In another embodiment, the sulfide is a metal sulfide, e.g., an alkali metal sulfide such as sodium sulfide.

In one embodiment, the NaOH concentration in the electrolyte of the battery is in the range of from 5-7.5 M, e.g., about 6 M, the LiOH concentration is in the range of from about 0.5 to 2.0 M, e.g., about 1 M, and the metal sulfide is present in an amount ranging from about 1 to 2 wt %. Cycling continues in the presence of the foregoing electrolyte until the state-of-charge of the cathode, e.g., nickel cathode, and iron anode are about equalized. Additional cycles after equalization is achieved can also be made to further condition the battery.

Conventional Ni—Fe batteries are typically of a pocket plate design, in which the active material is contained within a structure of interlocking perforated nickel plated strips. Alternatively, iron powder can be sintered into a solid structure. More recently, iron powder has been pasted into a porous nickel felt (J. Bockris, B. Conway, E. Yeager, R. White, "Comprehensive Treatise of Electrochemistry, Volume 3, Plenum Press, 1981). Such electrodes are bulky, resulting in low energy density, and are expensive to fabricate.

In one embodiment, the iron electrode used is one wherein iron powder is mixed with a binder and coated onto a single substrate such as a perforated metal foil, expanded metal, or Ni foam. In one embodiment, the binder comprises polyvinyl alcohol. The electrode is subsequently dried under controlled conditions and compacted to the desired thickness and porosity. Moreover, this electrode may contain various additives, including sulfur or a sulfur-containing compound.

It has been discovered that using the preferred electrolyte described above in combination with an iron electrode in the formation process of this invention significantly reduces the time required for activation of the cell or battery. In particular, use of this electrolyte in conjunction with an adhering type of iron electrode comprising iron active material pasted onto a conductive substrate such as a metal foil or foam, results in a battery with improved performance over Ni—Fe batteries of conventional pocket plate design. The use of a ternary electrolyte comprised of NaOH, LiOH, and a sulfide additive significantly reduces formation time for batteries employing an iron electrode which may or may not contain other additives such as sulfur or sulfides. The iron electrode may be of a sintered construction or a pasted construction.

Specifically, as demonstrated in the examples below, formation time for a cell containing an iron electrode in conjunction with a Ni(OH)$_2$ positive electrode and employing a ternary electrolyte of NaOH, LiOH, and a sulfide additive such as Na$_2$S reduces the formation time to as little as 2 hours, while yielding high initial capacity at low to moderate rates. Conditioning cycling at C/2 charge, C/10 discharge enables Ni—Fe cells with high capacity at moderate to high rates. The C-rate is used to signify a charge or discharge rate equal to the capacity of a battery divided by 1 hour. Thus, 2 C is twice the current needed to discharge a battery in one hour (fully discharged or charge a battery in 30 min at 2 C rate). For a 5 Ah battery, 2 C current would be 10 A. At C/10, it would take ten hours to discharge a fully charged battery.

The cycling protocol can be any conventional cycling protocol. However, generally, the protocol for the initial charging of the cell (cycling) is charging the cell between the C/2 and 2 rate until the cell is charged between 100 to 250% of its rated capacity. In one embodiment, the charge rate is 1 C. The first discharge is generally at the C/5 to C/20 rate to a voltage between 1.1 to 0.9V. In one embodiment, the discharge rate is about C/10. In another embodiment, the discharge rate is at C to C/20 rate until the cell voltage reaches between 1.1 to 0.9V.

Once the cycling protocol has been completed, the cells can be further conditioned by cycling an additional one to ten cycles. The charge can be, for example, at the C/4 to 1 C rate until the cell is charged at least 120 to 200% of its rated capacity. In one embodiment, the charge rate is about C/2.

The following examples are provided to further illustrate the present invention. The examples are meant to be merely illustrative, and are not limiting.

Example 1

A laboratory Ni—Fe cell was constructed by combining an Fe electrode pasted onto nickel plated steel (NPS) in conjunction with 2 Ni(OH)$_2$ electrodes of sintered construction having a rated capacity of 0.5 Ah. An electrolyte comprised of 8.3 N KOH with a K/Na/Li ratio of 6.3/1/1 was employed. The cell was formed by constant current charging at a rate of C/50 for 75 hours (0.01 amps). At the conclusion of charge, the cell was discharged at a rate of 0.01 A and delivered the rated capacity of 0.5 Ah.

While full cell capacity was obtained from this constant current formation process, the overall formation time would require significant capital investment in formation equipment at high production volumes, rendering it insufficient.

Example 2

A laboratory Ni—Fe cell was constructed employing an Fe electrode pasted onto NPS in conjunction with two Ni positive electrodes of pasted construction. The cell employed a mixed electrolyte of 6 M KOH with 1 M LiOH added. Cell rated capacity was 8.5 Ah. The cell was formed at a constant current of 1.7 amps for 12 hours, or a total of 20.4 Ah input (240% of rated capacity). On discharge at C/10 rate, the cell delivered just over 9 Ah. However, performance at higher discharge rates was not acceptable.

Example 3

Pulse charging was explored as a method to reduce formation time. A laboratory Ni—Fe cell was constructed employing a pasted Fe electrode in conjunction with two Ni sintered positive electrodes. The cell employed a mixed electrolyte of 6 M KOH with 1 M LiOH added. Cell rated capacity was 1.4 Ah. Pulses of various pulse widths from milliseconds to 10 seconds in length were evaluated, with currents ranging from 1.4 amps to up to 5.6 amps. A total charge input of 2.24 Ah was employed. On discharge, the cell exhibited low capacity, yielding only 0.2 Ah.

Example 4

A series of lab Ni—Fe cells were constructed by placing 3 pasted Fe electrodes in conjunction with 2 Ni sintered positive electrodes to provide a cell with a rated capacity of 0.8 Ah. Cells were formed and cycled in a series of electrolytes in the presence or absence of Na$_2$S. The base electrolyte was 20% KOH, with 50 g/L LiOH added. Control cells did not contain Na$_2$S, while experimental cells contained 1%, 2%, or 3% by weight Na$_2$S.

All cells were formed by charging at C/10 rate for 24 hours. After formation, cells were charged at C/10 and discharged at various rates ranging from C/10 to 2 C.
0% Na$_2$S
The cell with no added Na$_2$S exhibited 0.8 Ah after formation at C/10, but showed no capacity at C rate even after 50 cycles. C/10 capacity after 50 cycles had decreased to 0.7 Ah.
1% Na$_2$S
The cell formed and cycled in the presence of 1% Na$_2$S delivered over 0.7 Ah after formation. After 50 cycles, the cell demonstrated 0.8 Ah at C/10 and delivered over 0.6 Ah at C rate discharge.
2% Na$_2$S
The cell formed and cycled in the presence of 2% Na$_2$S delivered over 0.7 Ah after formation. After 50 cycles, the cell delivered 0.6 Ah at C rate and over 0.7 Ah at 2 C rate.
3% Na$_2$S
The cell formed and cycled in the presence of 3% Na$_2$S showed very low capacity after formation, but delivered 0.7 Ah on the fifth cycle. After continued cycling, the cell delivered 0.46 Ah at C rate discharge and 0.38 Ah at the 2 C rate.

Example 5

A series of cells were constructed employing pasted iron electrodes in combination with sintered Ni positive electrodes. The rated capacity of these cells was 1.6 Ah. The base electrolyte was 6 M NaOH, 1 M LiOH. Different levels of Na$_2$S were added to the cells, specifically 0%, 1 weight %, 2 weight %, and 3 weight %. Cells were then formed galvanostatically. Cells were initially charged at C rate for 2 hours. Cells were then conditioned by charging at C/2, followed by discharge at C/10, for a total of 5 cycles. Following formation, cells were emptied and fresh electrolyte of NaOH, LiOH was added to the cells. This was to evaluate the effect of sulfide additives on the formation process and to separate out any effects of sulfide on performance post formation. Control cells were formed in KOH, LiOH and the electrolyte was not replaced.

Cells formed in the presence of sulfide showed significantly improved capacity on discharge, particularly at high rates as shown in the Table below:

| Cell number | Na$_2$S in electrolyte | Capacity @ C/10 Cycle 1 (post-formation) | Capacity @ C/10 Cycle 6 | Capacity @ C/4 Cycle 7 |
|---|---|---|---|---|
| 1 | Control | 0.123 | 0.023 | 0.013 |
| 2 | Control | 0.116 | 0.023 | 0.012 |

-continued

| Cell number | Na₂S in electrolyte | Capacity @ C/10 Cycle 1 (post-formation) | Capacity @ C/10 Cycle 6 | Capacity @ C/4 Cycle 7 |
|---|---|---|---|---|
| 3 | 0% | 0.025 | 0.015 | 0.011 |
| 4 | 0% | 0.037 | 0.020 | 0.013 |
| 5 | 1% | 0.865 | 0.991 | 0.741 |
| 6 | 2% | 0.834 | 0.919 | 0.774 |
| 7 | 2% | 0.982 | 1.018 | 0.835 |
| 8 | 3% | 0.573 | 0.881 | 0.741 |
| 9 | 3% | 0.523 | 0.873 | 0.684 |

From this table it can be readily seen that the use of a ternary electrolyte in accordance with the present process coupled with a formation process of forming at C rate followed by condition cycling at C/2 charge, C/10 discharge for 5 cycles provides a cell with greater discharge capacity after formation, particularly at higher rates. Cells employing the ternary electrolyte exhibited high capacity at C/10 immediately after a formation process of charging at C rate to 200% of rated capacity.

While the foregoing written description of the invention enables one of ordinary skill to make and use what is considered presently to be the best mode thereof, those of ordinary skill will understand and appreciate the existence of variations, combinations, and equivalents of the specific embodiment, method and examples herein. The invention should therefore not be limited by the above described embodiment, method, and examples, but by all embodiments and methods within the scope and spirit of the invention.

What is claimed is:

1. A process for activating a battery comprising an iron electrode, comprising steps of:
   (i) providing a battery comprising a cathode and an iron anode, with the battery further comprising an electrolyte comprising NaOH, LiOH and a sulfide; and
   (ii) cycling the battery to equalize state-of-charge of the cathode and the iron anode.

2. The process of claim 1, wherein the battery comprises a nickel cathode.

3. The process of claim 1, wherein the sulfide is a metal sulfide.

4. The process of claim 3, wherein the metal sulfide is an alkali metal sulfide.

5. The process of claim 4, wherein the metal sulfide is sodium sulfide.

6. The process of claim 1, wherein the NaOH has a concentration in the range of 5 to 7.5 M in the electrolyte.

7. The process of claim 1, wherein cells of the battery are initially charged between the C/2 and 2 charge rate until a cell of the battery is charged between 100 to 250% of its rated capacity.

8. The process of claim 7 where the charge rate is about 1 C.

9. The process of claim 7 where the cells are further conditioned by cycling an additional one to ten cycles.

10. The process of claim 9 where charge in an additional cycling is at the C/4 to 1 C charge rate until the cell is charged at least 120 to 200% of its rated capacity.

11. The process of claim 10 where the charge rate is about C/2.

12. The process of claim 1 wherein a first discharge is at the C/5 to C/20 discharge rate to a voltage between 1.1 to 0.9 V.

13. The process of claim 12 where the first discharge is about C/10.

14. The process of claim 12 where discharge is at the C to C/20 discharge rate until the cell voltage reaches between 1.1 to 0.9 V.

15. The process of claim 14 where the discharge rate is about C/10.

16. The process of claim 1, wherein the NaOH concentration in the electrolyte is about 6 M, the LiOH concentration in the electrolyte is about 1 M, and sulfide concentration in the electrolyte is about 1 wt %.

17. The process of claim 1, wherein the iron anode comprises a single substrate coated on at least one side with an iron active material composition comprising a binder.

18. The process of claim 17, wherein the binder comprises polyvinyl alcohol.

19. The process of claim 17, wherein the iron anode further comprises a sulfur-containing compound.

20. A battery comprising an iron electrode formed by the process of claim 1.

* * * * *